United States Patent
Fallows et al.

(10) Patent No.: US 9,100,369 B1
(45) Date of Patent: Aug. 4, 2015

(54) SECURE REVERSE CONNECTIVITY TO PRIVATE NETWORK SERVERS

(75) Inventors: John R. Fallows, Palo Alto, CA (US); Christopher M. E. Barrow, San Mateo, CA (US)

(73) Assignee: Kaazing Corporation, San Jose, CA (US)

( * ) Notice: Subject to any disclaimer, the term of this patent is extended or adjusted under 35 U.S.C. 154(b) by 0 days.

(21) Appl. No.: 13/595,938

(22) Filed: Aug. 27, 2012

(51) Int. Cl.
*H04L 29/06* (2006.01)
*H04L 29/08* (2006.01)

(52) U.S. Cl.
CPC .......... *H04L 63/0281* (2013.01); *H04L 63/029* (2013.01); *H04L 67/2876* (2013.01); *H04L 63/0815* (2013.01); *H04L 63/20* (2013.01); *H04L 67/28* (2013.01)

(58) Field of Classification Search
None
See application file for complete search history.

(56) References Cited

U.S. PATENT DOCUMENTS

| | | | | |
|---|---|---|---|---|
| 5,617,540 | A * | 4/1997 | Civanlar et al. | 370/395.54 |
| 6,349,336 | B1 * | 2/2002 | Sit et al. | 709/227 |
| 8,041,939 | B2 * | 10/2011 | Ylitalo et al. | 713/151 |
| 2002/0161904 | A1 * | 10/2002 | Tredoux et al. | 709/229 |
| 2003/0154306 | A1 * | 8/2003 | Perry | 709/245 |
| 2007/0061460 | A1 * | 3/2007 | Khan et al. | 709/225 |
| 2007/0180512 | A1 * | 8/2007 | Chaudhuri et al. | 726/12 |
| 2007/0214251 | A1 * | 9/2007 | Li | 709/223 |
| 2009/0064307 | A1 * | 3/2009 | Holar et al. | 726/12 |
| 2012/0278487 | A1 * | 11/2012 | Woelfel | 709/226 |
| 2012/0278872 | A1 * | 11/2012 | Woelfel et al. | 726/7 |

* cited by examiner

*Primary Examiner* — Andrew Nalven
*Assistant Examiner* — Christopher Ruprecht
(74) *Attorney, Agent, or Firm* — Van Pelt, Yi & James LLP (57) ABSTRACT

Establishing a connection is disclosed. A first communication link with a perimeter gateway located external to a private network firewall but behind a perimeter network firewall is initiated. A request to allow the connection from a requestor that has requested the connection to an internal server via the perimeter gateway is received. A second communication link with the internal server protected by the private network firewall is initiated. The connection is allowed at least in part by associating together the first communication link with the second communication link.

18 Claims, 6 Drawing Sheets

SECURE REVERSE CONNECTIVITY TO PRIVATE NETWORK SERVERS

BACKGROUND OF THE INVENTION

The Internet, as conventionally understood, is a heterogeneous collection of interconnected networks allowing largely undifferentiated public access to the connected computing systems. A client, generically a client application program executed on a network connected computer system, can request a connection to any server computer system with a publically resolvable domain name or explicit Internet address. In general terms, the connection request is defined by a combination of source and destination internet protocol (IP) network addresses, a network transport protocol type, and a network port number. The network addresses define at least the publically known end-points of the connection. The protocol type, such as HTTP (Hypertext Transfer Protocol), TCP (Transmission Control Protocol), UDP (User Datagram Protocol), WS (Web Services), and corresponding encrypted variants, allows the client to specify the communications protocol required for connection. The network port number, in combination with the source network address, enables the server computer system, generically the network operating system executed by a server computer system, to uniquely identify a client connection. The operation of accepting and establishing a requested connection by a server is generally referred to as binding. Once a bound connection is established, commands and data may be exchanged through the connection.

Beyond issues involving reachability, security has been and will likely remain a primary issue for network connected computer systems. Various strategies have become conventionally adopted to manage security issues, including the use of firewalls and dedicated internet servers, to isolate and limit security exposures. In larger, typically corporate network architectures, a perimeter network is established around a private intranet. The various client and server computer systems connected to this private intranet are, by design of the perimeter network, not visible by domain name or IP address to systems outside the private intranet that are connected to the public Internet. This precludes connection requests from the Internet from directly reaching the private intranet. Internet connections to the server systems within the perimeter network are allowed.

Circumstances exist where selective public access through the Internet-facing firewall of the perimeter network is desirable. Port-forwarding, conventionally implemented as a socket proxy, allows Internet connections to the perimeter firewall to be relayed to a computer system connected to the internal private network. Qualifying connections are constrained by protocol type and port number as configured on the perimeter firewall. The destination port, the target of the forwarded port, is also identified as part of the configuration data stored on the firewall. Opening a port for port-forwarding increases the risk of a security breach, particularly since identification of the destination port implies knowledge of the internal network, as well as imposes a non-standard security management responsibility. Thus, port-forwarding may not be possible by management policy or where the firewall is independently managed.

Consequently, there exists a need for a way to selectively and securely enable inbound connections to a system on a private network.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a hardware virtualization; a software virtualization; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Enabling secure communications between public and private networks are disclosed. In some embodiments, establishing the communication includes establishing secure proxy communication connections between public and private networked computer server systems. In some embodiments, a perimeter gateway server behind a perimeter network firewall services network communications with respect to an external network and/or a perimeter network. This perimeter gateway server may host a reverse proxy service. An internal gateway server is located behind a private network firewall with limited and securely constrained connectivity from the perimeter gateway server. A private internal server is also located behind the private network firewall and hosts data and/or service accessible by the internal gateway server. The internal gateway server operates autonomously to initiate and maintain a network communications link with the private internal server and the perimeter gateway server to enable reverse proxy access to the data/service of internal server(s). The internal gateway server may also autonomously direct operation of the reverse proxy service to enable listening for and binding to connection requests received by the perimeter gateway server from a requester located external to the private network.

In some embodiments, the perimeter and internal gateway servers allow efficient and secure reverse connectivity to private network servers. Inbound connections to internal server systems may be made securely without significantly altering the risk assessment of the protected, private network. Security may be preserved while allowing an existing perimeter network to remain substantially unchanged. In some embodiments, no additional network port is required to be opened in the private network firewall. For example, a known network port is used in combination with protocol conversion to establish a connection from the internal gateway server to the perimeter gateway server through the private network firewall. In some embodiments, one or more layers of secure authorization are provided to prevent insecure connections to any internal server.

One example of a reverse proxy includes a reverse SOCKS proxy. In the typical, forward configuration, a SOCKS proxy is implemented on a firewall system to allow a client to establish outgoing connections through the firewall to an Internet server computer system. A SOCKS proxy daemon executes on the firewall to listen for client connection requests, establish a corresponding outbound connection, and thereafter operate functionally as a communications pass through. In the reverse configuration, the SOCKS proxy can be used to allow inbound connections. Like port-forwarding, one or more ports may be opened on the firewall system to allow incoming connection requests. Requests inbound on these open ports are passed to the reverse SOCKS proxy for binding. Conventionally, the reverse SOCKS proxy is executed on a perimeter firewall system. When an incoming connection is bound, the reverse SOCKS proxy may select and establish a connection to a corresponding service. Generally, a service is an application executed on a server to provide a defined function, such as a database service or an e-mail delivery service. A reverse SOCKS proxy is conventionally provided with local configuration data that identifies the services and corresponding server systems capable of handling the requested communications.

Figure 1A:
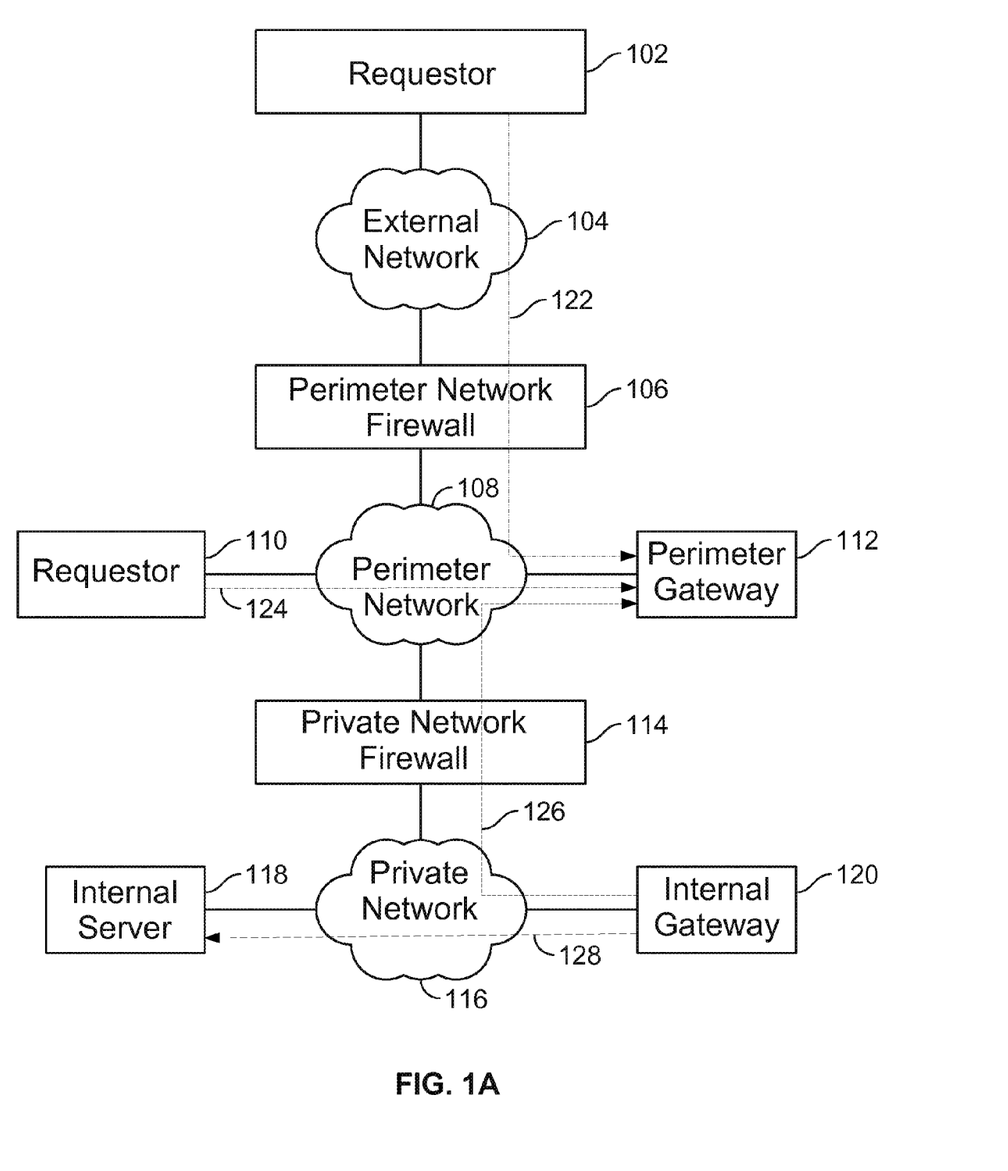
FIGS. 1A and 1B are block diagrams illustrating examples of a communication environment between a public network and a private network.
Figure 1B:
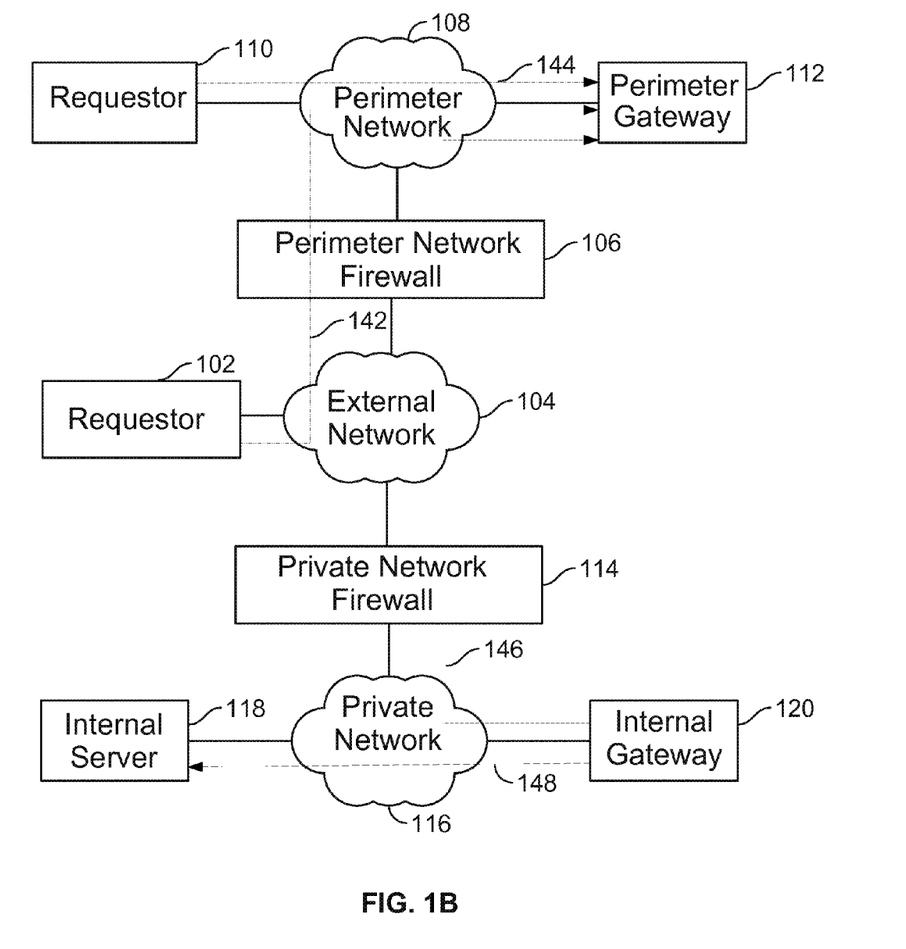

FIGS. 1A and 1B are block diagrams illustrating examples of a communication environment between a public network and a private network. In the example shown, requestor 102 and/or requestor 110 desires to access data and/or services that require access to internal server 118. In some embodiments, requestor 102 and/or requestor 110 includes an internet server. For example, requestor 110 includes an internet server that provides data (content intended to be publically available such as a web content) and/or services to one or more clients connected to external network 104. Examples of requestor 102 and requestor 110 include one or more hardware or software systems (e.g., a client, a server, a virtual component, etc.), components, processes, and/or applications that desire to access data and/or services that require access to internal server 118. Examples of external network 104 include one or more of the following: a direct or indirect physical communication connection, mobile communication network, Internet, Wide Area Network, Storage Area Network, and any other form of connecting two or more systems, components, or storage devices together. Perimeter firewall 106 includes a firewall server accessible publically via external network 104 that manages access to one or more components connected to perimeter network 108. In some embodiments, perimeter firewall 106 operates to limit access by one or more of the following: a protocol type, a network, an IP address, a source address, a destination, a header, an identifier and communication content. Examples of perimeter network 108 include one or more of the following: a direct or indirect physical communication connection, DMZ network, mobile communication network, intranet, Local Area Network, Wide Area Network, Storage Area Network, and any other form of connecting two or more systems, components, or storage devices together.

Private network firewall 114 securely isolates private network 116 and components connected to private network 116 from a network (e.g., perimeter network 108) external to private network 116. Examples of private network 116 include one or more of the following: a direct or indirect physical communication connection, mobile communication network, Wide Area Network, Storage Area Network, and any other form of connecting two or more systems, components, or storage devices together. Internal server 118 is connected to private network 116 and may host a service and/or data that is desired to be accessed by a component outside of private network 116. For example, requestor 102 desires access to a service/data hosted by internal server 118. In another example, requestor 110 desires to access service/data hosted by internal server 118 (e.g., in response to a request received at requestor 110 from an external client). In some embodiments, the security policies that define the operation of private network firewall 114 are substantially more restrictive that those employed by perimeter firewall 106. For example, the security policies of private network firewall 114 nominally restrict the allowed network connections to outbound only. This allows internal server 118 to initiate communications with requestor 110 and, directly or indirectly, access external network 104 (e.g., public Internet). Inbound connections to private network firewall 114 may be considered security exposures and therefore may be discouraged. In some embodiments, if an inbound connection port is opened on private network firewall 114, it must be actively managed. The example of FIG. 1A shows perimeter network 108 only connected to private network firewall 114. The example of FIG. 1B shows private network firewall 114 directly connected to external network 104. For example, information sent from internal server 118 to requestor 110 must first pass through private network 116, then private network firewall 114, then external network 104, then perimeter firewall 106, and then through perimeter network 108 to arrive at requestor 110. FIGS. 1A and 1B are merely examples and other network configurations may be used.

Perimeter gateway 112 is connected to perimeter network 108 and enables a requester to initiate a communication with internal server 118 without directly initiating a connection to private network firewall 114. For example, perimeter gateway 112 supports inbound connections from requestor 110 (e.g., via connection 124 or connection 144) and/or requestor 102 (e.g., via connection 122 or connection 142). In some embodiments, perimeter gateway 112 utilizes a connection established from internal gateway 120 that is connected to private network 116 (e.g., via connection 126 or connection 146). For example, perimeter gateway 112 hosts a reverse proxy service and obtains access to one or more components connected to private network 116 via an established connection (e.g., connection 126 or connection 146) with internal gateway 120. By utilizing perimeter gateway 112 and internal gateway 120, inbound connections for internal server 118 may be supported without requiring an open port on private network firewall 114 and without requiring perimeter gateway 112 to possess security compromising information of private network 116 protected by private network firewall 114. In some embodiments, by utilizing perimeter gateway 112 and internal gateway 120, the security risk assessment of an enterprise network, specifically for a private network, may remain substantially unchanged when allowing incoming connections. In some embodiments, perimeter gateway 112 and internal gateway 120 may be used to bypass one or more levels and/or zones of a network configuration such as one or more DMZs of a network with multiple DMZs.

In some embodiments, internal server 118 may be implemented as a computer server. Internal server 118 hosts one or more services. Examples of services hosted by internal server 118 include a network file server service, a calendaring or other customer relations management (CRM) service, a network-based videoconferencing service, relational database services, and other services provided by a networked server.

In some embodiments, perimeter gateway 112 may include a conventional computer server with dual network interfaces, permitting independent connectivity to private network firewall 114 and to a requestor (e.g., requestor 110 or requestor 102 of FIG. 1A or 1B). In some embodiments, perimeter gateway 112 hosts a reverse proxy server as a service accessible (e.g., exclusively) by a requestor. In some embodiments, configuration data is loaded by the reverse proxy server from a local data store of perimeter gateway 112. In some embodiments, perimeter gateway 112 includes an authentication manager that handles connection authentication (e.g., by accessing an LDAP (Lightweight Directory Access Protocol), KERBEROS, or other external secure certificate authority) with internal gateway 120 and/or a requestor. In some embodiments, authentication is at least in part handled by a component external to perimeter gateway 112 such as a trusted third party (e.g., a certificate authority). In some embodiments, a reverse proxy server included in perimeter gateway 112 may be implemented as a reverse SOCKS (SOCKet Secure) server extended to add configuration, connection, and authentication behaviors. For example, a reverse SOCKS proxy daemon listens for client connection requests on one or more ports. Requests inbound on these open ports are passed to the reverse SOCKS proxy for binding. When an incoming connection is bound, the reverse SOCKS proxy may select and establish a connection to a corresponding service (e.g., an application executed on a server computer system to provide a defined function, such as database serving or e-mail delivery). A reverse SOCKS proxy may be provided with local configuration data that identifies the services and corresponding server systems capable of handling the requested communications.

In some embodiments, internal gateway 120 includes a conventional computer server with dual network interfaces. In some embodiments, a proxy client is hosted on internal gateway 120. Configuration data that defines the operational behavior of the proxy client may be obtained from a local configuration data store of internal gateway 120. In some embodiments, the proxy client, in combination with a connection manager included in gateway 120, operates autonomously to establish network connections with a hosted service of internal server 118 (e.g., via connection 128 or connection 148) and a reverse proxy server of perimeter gateway 112 (e.g., via connection 126 or connection 146), the latter being routed through private network firewall 114. In some embodiments, because the connection (e.g., connection 126 or connection 146) between the proxy client of internal gateway 120 and the proxy server of perimeter gateway 112 is outbound relative to internal gateway 120 and persistent, open ports are not required on private network firewall 114. In some embodiments, the proxy client of internal gateway 120, independently or in response to the operation of a connection manager included in gateway 120, periodically polls the proxy server of perimeter gateway 112 for the presence of a then currently pending connection. For example, where a pending connection is present, the polling connection can be either consumed by the proxy server as the corresponding proxy connection or used to direct creation of a new connection for the pending connection. In some embodiments, in the absence of a pending connection, the polling connection may be dropped temporarily to conserve resources.

In some embodiments, requestor 110 or another server may be operated as a broker for pending connections. For example, perimeter gateway 112 will message the broker server over respective established connections when new connection requests are received. Internal gateway 120 may poll the broker server for the presence of a pending connection specific to the internal gateway. Where a corresponding connection is pending, the broker server will message internal gateway 120 with sufficient information to enable internal gateway 120 to establish a connection with the correct perimeter gateway.

In some embodiments, perimeter gateway 112 and internal gateway 120 may communicate through multiplexed connections. For example, multiple logical connections, each corresponding to a separate connection, are passed over a single or reduced number of actual network connections established between perimeter gateway 112 and internal gateway 120. Internal gateway 120 may establish a multiplexed channel identifier for each logical connection that is shared with perimeter gateway 112 when a new logical connection is created. The multiplexed logical connections may be transparent to internal server 118 and a requestor connected to perimeter gateway 112. In some embodiments, a communication protocol such as SPDY (developed by Google, Inc. of Mountain View, Calif.) is utilized on top of a connection between perimeter gateway 112 and internal gateway 120 to enable the multiple logical connections.

In some embodiments, internal gateway 120 establishes a dedicated command/control connection with perimeter gateway 112 to enable monitoring and communication of connection requirements of perimeter gateway 112. For example, in heavy use situations, the rate and nature of connection requests to perimeter gateway 112 to access one or more components of private network 116 can be observed by internal gateway 120, allowing proactive creation of an appropriate number and/or type of connection from internal gateway 120 to perimeter gateway 112. A pool of available connections, logical or real, may be maintained and efficiently used by internal gateway 120 to quickly establish new connections while conserving resources. In various embodiments, internal gateway 120 and/or perimeter gateway 112 may include memory and/or storage that tracks logical correspondences between bound incoming and outgoing connections. In some embodiments, one or more connections may be disconnected, removed, created, and/or modified based at least in part on a utilization/availability of one or more connection resources.

In various embodiments, the components shown in FIGS. 1A and 1B may exist in various combinations of hardware machines. One or more of the components shown in FIGS. 1A and 1B may be included in the same machine. Other communication paths may exist and the examples of FIGS. 1A and 1B has been simplified to illustrate the example clearly. Although single instances of components have been shown to simplify the diagram, additional instances of any of the components shown in FIGS. 1A and 1B may exist. For example, multiple requestors may make simultaneous multiple requests for services/content of multiple internal servers via perimeter gateway 112 and internal gateway 120. Components not shown in FIGS. 1A and 1B may also exist.

Figure 2:
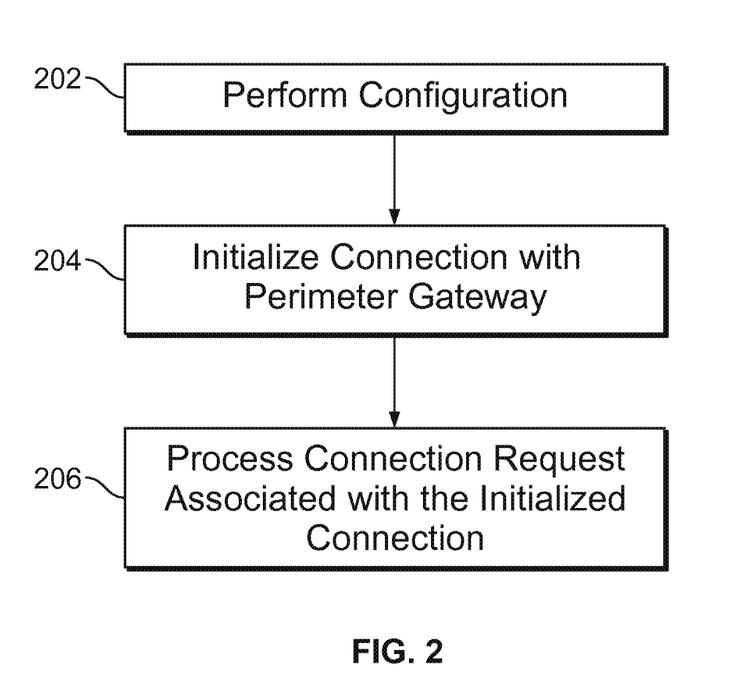
FIG. 2 is a flow chart illustrating an embodiment of a process for initializing a communication link.

FIG. 2 is a flow chart illustrating an embodiment of a process for initializing a communication link. In some embodiments, the process of FIG. 2 is implemented on internal gateway 120 of FIG. 1A and/or FIG. 1B. At 202, a configuration is performed. In some embodiments, performing the configuration includes receiving configuration data and using the received configuration data to perform the configuration. In some embodiments, the configuration data specifies a connection to be established and includes one or more of the following: a connection identifier, a network address, a protocol identifier, a Uniform Resource Identifier (URI), a port number, proxy connection information, and a specification of a connection option.

Table 1 below provides an illustrative example of a configuration data used to perform the configuration.

TABLE 1

Internal Gateway Configuration

```
<service>
    <accept>pipe://service-1</accept>
    <connect>tcp://internal-server:5555</connect>
    <type>proxy</type>
    <accept-options>
        <pipe.transport>socks.ssl://perimeter-gateway:4444</pipe.transport>
        <socks.mode>reyerse</socks.mode>
        <socks.maximum.retry.interval>5sec</socks.maximum.retry.interval>
    </accept-options>
</service>
```

In Table 1 above, the first service tag statement defines a logical connection to be established between a perimeter gateway (e.g., perimeter gateway 112 of FIG. 1A or 1B), "perimeter-gateway," and a service provided by an internal server (e.g., internal server 118 of FIG. 1A or 1B), "internal-server", on port 5555. The accept tag statement specifies the URI that may be utilized by the perimeter gateway to connect to the specified service (e.g., tcp://internal-server:5555) provided by the internal server. The prefix "pipe://" defines that a generic communication pipe is being established and any supported communication protocol may be used. In some embodiments, a communication protocol and/or a type of connection that must be used may be specified in the URI included in the accept tag statement. In some embodiments, a specific protocol, such as TCP, SSL, WS, WSS, UDP, SPDY, etc., may be specified in the prefix. For example, the URI "wss://internal-gateway:443/service-1" may be used to specify that a WSS connection must be utilized. In some embodiments, another communication protocol such as SPDY may be utilized by the WSS connection to allow multiplexing of connections. The connect tag statement defines the connection protocol, location identifier, and port number for one or more services of an internal server (e.g., internal server 118 of FIG. 1A or 1B) to be connected. The pipe.transport and the socks.mode tag statements define the network protocol (e.g., SOCKS and SSL) and a connection path (e.g., "perimeter-gateway:4444") that will be used to initiate a connection with the perimeter gateway to establish a specified type (e.g., reverse) of proxy connection. For example, the pipe.transport tag specifies the address of a reverse socks proxy server in the perimeter gateway. An optional socks.connect.maximum.retry.interval statement is used to define a maximum time interval between each attempt to connect to a perimeter gateway to establish a reverse proxy connection. Repeated connection attempts may be progressively delayed up to the specified interval in seconds.

Although the example above shows an internal gateway being preconfigured with internal server service location identifiers, protocol specifications, and other configuration information, in other embodiments, at least portions of the information configured using the configuration data of Table 1 may be dynamically configured. For example, location of a desired service of an internal server may be provided by the perimeter gateway when a connection request is received from the perimeter gateway.

At 204, a connection with a perimeter gateway is initialized. In some embodiments, the perimeter gateway includes perimeter gateway 112 of FIG. 1A and/or FIG. 1B. In some embodiments, initializing the connection (e.g., communication link) includes establishing an authenticated connection with the perimeter gateway (e.g., reverse proxy server included in the perimeter gateway). For example, connection 126 of FIG. 1A is established. In another example, connection 146 of FIG. 1B is established. In some embodiments, an established connection is to be utilized by the perimeter gateway to provide a reverse proxy service to an internal server via an internal gateway that is initiating the connection. The authenticated connection may be established using public key cryptography, certificate authentication, and/or any other way of establishing a secure connection. In some embodiments, the authentication is performed as an automated machine-to-machine authentication. In some embodiments, the connection is established through a private network firewall such as private network firewall 114 of FIG. 1A and/or FIG. 1B. The information required to initialize the connection may be preconfigured (e.g., using configuration data of step 202) and/or dynamically determined. For example, in some embodiments, the dynamic determination is accomplished using a table, a database, a service (e.g., a networked naming service), a resource indicator and/or other dynamically changing/updated information. In some embodiments, if a secure authenticated connection cannot be established, the process ends and an error message is provided. In some embodiments, the initialized connection may only allow a limited functionality/communication to maintain security of a private network. For example, only predetermined communication may be communicated via the connection. In some embodiments, if a connection to the perimeter gateway cannot be established, the connection is reattempted a predetermined number of times before the process ends and an error message is provided.

In some embodiments, the initialized connection is a secure encrypted connection and an unencrypted protocol utilized over the connection is effectively encrypted. In the example shown in Table 1, the connection with a perimeter gateway is initialized using the protocol and address path specified using the "pipe.transport" tag statement. Utilizing the SOCKS protocol is merely an example, in that a variation of the SOCKS protocol and/or another protocol may be used to initialize/establish/utilize a reverse proxy connection. In some embodiments, the established connection is a multiplexed connection. For example, the established connection utilizes SPDY protocol or any other multiplexing protocol that allows multiple logical connections on a single established connection.

In some embodiments, initializing the connection includes providing a connection identifier of the connection to the perimeter gateway. In some embodiments, the identifier identifies the established connection and/or the connection that can be used by the perimeter gateway to utilize the connection (e.g., connect to data/services of an internal server protected by a private network firewall). In some embodiments, the connection identifier is provided via the connection. In some embodiments, the connection identifier is preconfigured and specified in a configuration file of an internal gateway and/or perimeter gateway. For example, Table 1 shows the connection identifier "pipe://service-1." The perimeter gateway may utilize this URI to request a connection to an internal server of a private network. Although this example utilizes the generic pipe prefix, in various embodiments, any of a plurality of protocols may be specified and utilized in the connection between the internal gateway and the perimeter gateway. In some embodiments, the connection identifier is utilized by an internal gateway to monitor connection requests utilizing the connection identifier. In some embodiments, the internal gateway monitors the established connection for a connection request from the perimeter gateway. In some embodiments, the connection identifier identifies one of a plurality of logical connections of a multiplexed connection.

In some embodiments, timing associated with the connection is controlled statically and/or dynamically using one or of the following: a heuristic, a process, a rule, a security policy, received information and dynamically updated/changing information. For example, the timing of when a new logical connection may be formed is controlled by controlling the timing associated with when the connection at 204 is initialized. The timing of the connection may be controlled to reduce the amount of time and/or probability that the connection and/or one or more network components of the connection could be compromised by a security attack. Examples of the timing associated with the connection includes when the connection is initialized, a length of time the connection is attempted to be initialized, a number of times the connection is attempted to be initialized, a length of the connection, and one or more timing parameters associated with connection and/or initialization of the connection.

At 206, a connection request associated with the initialized connection is processed. In some embodiments, processing the connection request includes receiving a connection request from a perimeter gateway. For example, the perimeter gateway receives a connection request from a requestor to access data/service of an internal server not directly accessible by the requestor, and the perimeter gateway sends a connection request to the internal gateway to request access to the internal server via the connection. In some embodiments, a connection request is provided using a connection identifier and the connection identifier is utilized to associate together (e.g., bind) a connection between an internal server with an internal gateway (e.g., connection 128 of FIG. 1A or connection 148 of FIG. 1B) together with the connection between the perimeter gateway and the internal gateway (e.g., connection 126 of FIG. 1A or connection 146 of FIG. 1B). In some embodiments, the connection request is received via the initialized connection. In some embodiments, the connection request is received on a connection separate from the initialized connection. For example, a separate control connection is established between the internal gateway and the perimeter gateway and the control connection is utilized to communicate information required to establish and/or manage one or more connections utilized to access an internal server.

Figure 3:
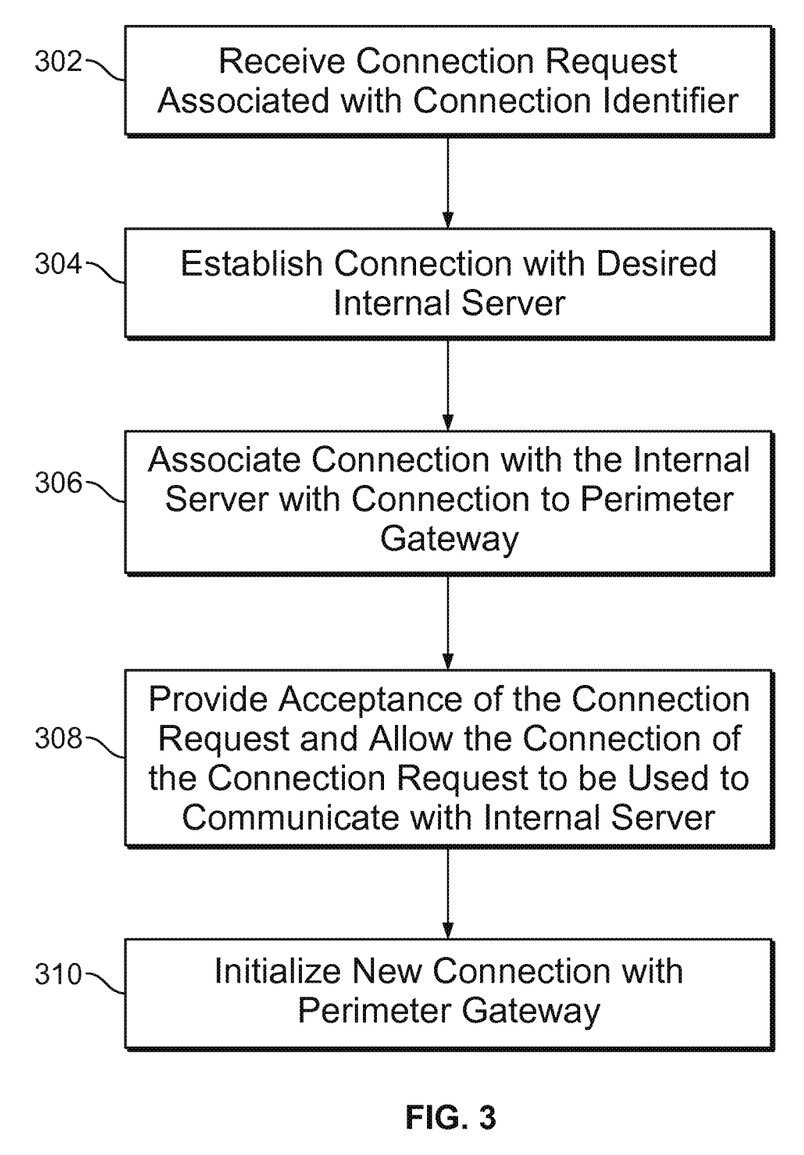
FIG. 3 is a flow chart illustrating an embodiment of a process for processing a connection request.

FIG. 3 is a flow chart illustrating an embodiment of a process for processing a connection request. The process of FIG. 3 may be implemented on internal gateway 120 of FIG. 1A and/or FIG. 1B. In some embodiments, the process of FIG. 3 is included in 206 of FIG. 2. At 302, a connection request associated with a connection identifier is received. In some embodiments, the received connection request is associated with a connection identifier associated with steps 204 and/or 206 of FIG. 2. For example, a perimeter gateway receives a connection request from a requestor to access data/service of an internal server not directly accessible by the requestor, and the perimeter gateway sends a connection request to an internal gateway to request access to the internal server via the connection.

At 304, a connection with a desired internal server is established. In some embodiments, establishing the connection includes establishing connection 128 of FIG. 1A. In some embodiments, establishing the connection includes establishing connection 148 of FIG. 1B. In some embodiments, establishing the connection includes establishing a connection with a specific service/data (e.g., specific port number) of the internal server. In some embodiments, establishing the connection includes establishing the connection using a preconfigured location identifier (e.g., included in a configuration data utilized at 202 of FIG. 2). In some embodiments, establishing the connection includes dynamically determining a location of a desired internal server and/or a service of the desired internal server. For example, the request received at 302 includes an identifier of a desired internal server and/or a desired data/service, and the identifier is used to dynamically determine a location address utilized to connect with the desired internal server. In some embodiments, the determination is accomplished using a table, a database, a service, a resource indicator and/or other dynamically changing/updated information. In some embodiments, if the connection with the desired internal server cannot be established, the connection is reattempted a predetermined number of times before ending the process and providing an error message.

At 306, the connection with the internal server is associated with a connection to a perimeter gateway. In some embodiments, the connection to the perimeter gateway includes the connection established at 204 of FIG. 2. In some embodiments, the connection to the perimeter gateway is the connection used to receive the request in 302. In some embodiments, associating together the connection includes binding the connections. In some embodiments, associating together the connection includes allowing communications to pass through between the connections. In some embodiments, associating together the connections includes associating together an identifier of the connection with the internal server with an identifier of the connection to the perimeter gateway. In some embodiments, associating together the connections includes associating together a connection with the internal server with a logical connection of a multiplexed connection to a perimeter gateway.

At 308, an acceptance of the connection request is provided, and the connection associated with the connection request is allowed to be used to communicate with the internal server. In some embodiments, providing the acceptance includes providing a notification to a perimeter gateway that the perimeter gateway can utilize the connection to the internal server. In some embodiments, allowing the connection to be utilized includes proxying communication between the connection with the desired internal server and the connection to the perimeter gateway.

At 310, a new connection with the perimeter gateway is initialized. In some embodiments, initializing the new connection includes establishing the new connection. In some embodiments, the new connection is initialized to allow a new connection request for data/service of an internal server to be processed using the new connection because a previously established connection has been utilized at 306 and 308. In some embodiments, initializing the new connection includes performing at least a portion of the process of FIG. 2. In some embodiments, the configuration information utilized to initialize the new connection may be preconfigured and/or received from a perimeter gateway. In some embodiments, at 310 a single new connection is established after a previously established connection has been associated (e.g., bound) with a connection to a desired internal server. In some embodiments, a plurality of new connections is initialized at the same time. For example, serialized initiation of a single new connection after each previously established communication is bound may be inefficient when there exists a known large number of new connections to be bound. In some embodiments, a perimeter gateway provides an identifier associated with a number of pending connections to be bound, and the gateway initializes a number of new connections based on to the number of pending connections. In some embodiments, the identifier associated with a number of pending connections is obtained by an internal gateway at least in part by polling and/or requesting information from the perimeter gateway. In some embodiments, initializing the connection includes initializing a new logical connection of a multiplexed connection connecting an internal gateway and a perimeter gateway.

Figure 4:
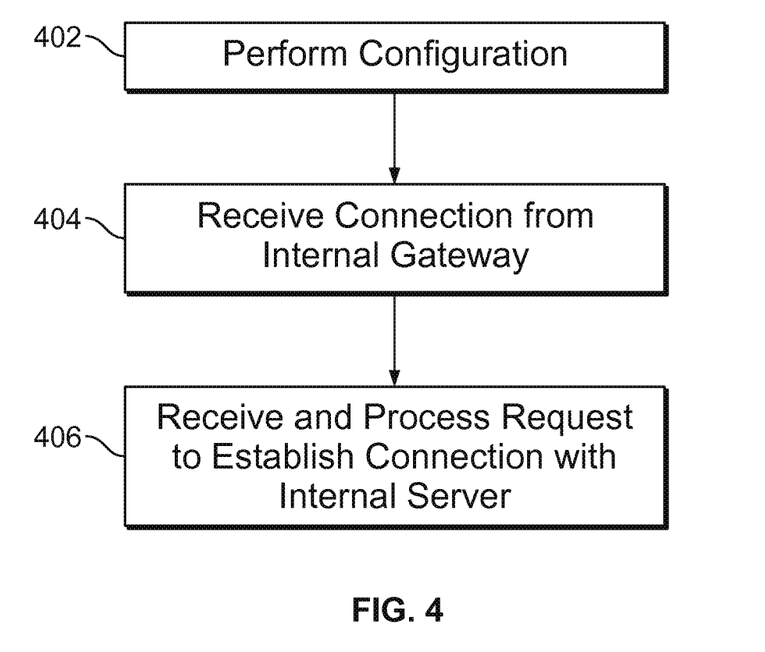
FIG. 4 is a flow chart illustrating an embodiment of a process for receiving a connection.

FIG. 4 is a flow chart illustrating an embodiment of a process for receiving a connection. In some embodiments, the process of FIG. 4 is implemented on perimeter gateway 112 of FIG. 1A and/or FIG. 1B. At 402, a configuration is performed. In some embodiments, performing the configuration includes receiving configuration data and using the received configuration data to perform the configuration. In some embodiments, the configuration data specifies a connection used to provide a reverse proxy service. The specification of the connection may include one or more the following: a connection identifier, a network address, a protocol identifier, a Uniform Resource Identifier (URI), a port number, an Internet Protocol identifier, proxy connection information, and a specification of a connection option.

Table 2 below provides an illustrative example of a configuration data used to perform the configuration.

TABLE 2

Perimeter Gateway Configuration

```
<service>
    <accept>ws://perimeter-gateway/service-1</accept>
    <connect>pipe://service-1</connect>
    <type>proxy</type>
    <connect-options>
        <pipe.transport>socks.ssl://perimeter-gateway:4444</pipe.transport>
        <socks.mode>reverse</socks.mode>
        <socks.ssl.client.certificate>required</socks.ssl.client.certificate>
    </connect-options>
</service>
```

In Table 2 above, the service tag statement defines a potential logical connection between a requestor (e.g., requestor 102 or 110 of FIG. 1A or 1B) communicating to the perimeter gateway via "ws://perimeter-gateway/service-1" URI, and a connection with an internal gateway identified by connection identifier "pipe://service-1." The accept tag statement specifies an identifier of a connection where a request for a connection with a private internal server may be received. The connect tag statement of Table 2 corresponds to the accept tag statement in Table 1 and specifies the connection to be utilized to bind the request received via the accept tag statement in Table 2. The pipe.transport tag statement identifies the access protocol and path of a proxy server included in the perimeter gateway where a connection from an internal gateway may be received to establish a reverse proxy connection. The socks.mode tag statement specifies the type of SOCKS proxy (e.g., reverse) connection to be established. An optional socks.ssl.require.certificate tag statement specifies that a client certificate, matching the parameter pattern, is required by the perimeter gateway. Although the example above shows a perimeter gateway being preconfigured, in other embodiments, at least portions of the information configured using the configuration data of Table 2 may be dynamically configured. For example, in some embodiments, the dynamic configuration is accomplished using dynamically received information (e.g., from an internal gateway).

At 404, a connection from an internal gateway is received. In some embodiments, the internal gateway includes internal gateway 120 of FIG. 1A and/or FIG. 1B. In some embodiments, the received connection includes the connection initialized in 204 of FIG. 2. In some embodiments, the received connection includes connection 126 of FIG. 1A. In some embodiments, the received connection includes connection 146 of FIG. 1B. In some embodiments, received connection is to be utilized to provide a reverse proxy service to an internal server via an internal gateway that is initiating the connection. In some embodiments, the connection is a secure connection and may be established using public key cryptography, certificate authentication, and/or any other of way establishing a secure connection. In some embodiments, the authentication is performed as an automated machine-to-machine authentication. In some embodiments, the authentication is a mutual authentication between a perimeter gateway and an internal gateway. In some embodiments, the connection is received through a private network firewall such as private network firewall 114 of FIG. 1A and/or FIG. 1B. In some embodiments, the connection is received through a private network firewall and a perimeter firewall such as perimeter firewall 106 of FIG. 1A and/or FIG. 1B. The information required to receive the connection may be preconfigured (e.g., using configuration data of step 402) and/or dynamically determined. For example, in some embodiments, the dynamic determination is accomplished using dynamically received information (e.g., from an internal gateway). In some embodiments, if a secure authenticated connection cannot be established, the process ends, an error message is provided, and the connection is not accepted.

In some embodiments, the received connection is a secure encrypted connection and an unencrypted protocol utilized over the connection is effectively encrypted. In the example shown in Table 2, the connection from the internal gateway is received using the protocol and a location address specified using the "pipe.transport" tag statement. Utilizing the SOCKS protocol is merely an example, a variation of the SOCKS protocol and/or another protocol may be used to initialize/establish/utilize a reverse proxy connection. In some embodiments, the established connection is a multiplexed connection. For example, the established connection utilizes SPDY protocol or any other multiplexing protocol and allows multiple logical connections on a single established connection.

In some embodiments, receiving the connection includes receiving a connection identifier of the connection from the internal gateway. In some embodiments, the identifier identifies the received connection and/or the identifier used to utilize the connection (e.g., connect to data/services of an internal server via the connection of the identifier). In some embodiments, the connection identifier is provided via the connection. In some embodiments, the connection identifier is preconfigured and specified in a configuration file of an internal gateway and/or perimeter gateway. For example, Table 2 shows the connection identifier "pipe://service-1." This identifier may be stored and utilized to request a connection to an internal server of a private network. Although this example utilizes a generic pipe prefix, in various embodiments, any of a plurality of protocols may be specified and utilized in the connection between the internal gateway and the perimeter gateway. For example, the URI "wss://internal-gateway:443/service-1" may be utilized to specify the WSS protocol. In some embodiments, the connection identifier identifies one of a plurality of logical connections of a multiplexed connection.

At 406, a request to establish a connection with an internal server is received and processed. In some embodiments, the request is received from a requester such as requestor 102 (e.g., via connection 122 or connection 142) and/or requestor 110 (e.g., via connection 124 or connection 144) at perimeter gateway 112 to access internal server 118 of FIGS. 1A and/or 1B. In some embodiments, the request includes an identifier of a desired data, service and/or system to be accessed. In some embodiments, processing the request includes determining an appropriate connection identifier of a connection with an appropriate internal gateway to service the request. In some embodiments, processing the request includes binding the request with an appropriate connection with an appropriate internal gateway to service the request. In some embodiments, if an appropriate connection and/or an appropriate internal gateway cannot be determined, the process ends and an error message is provided.

Figure 5:
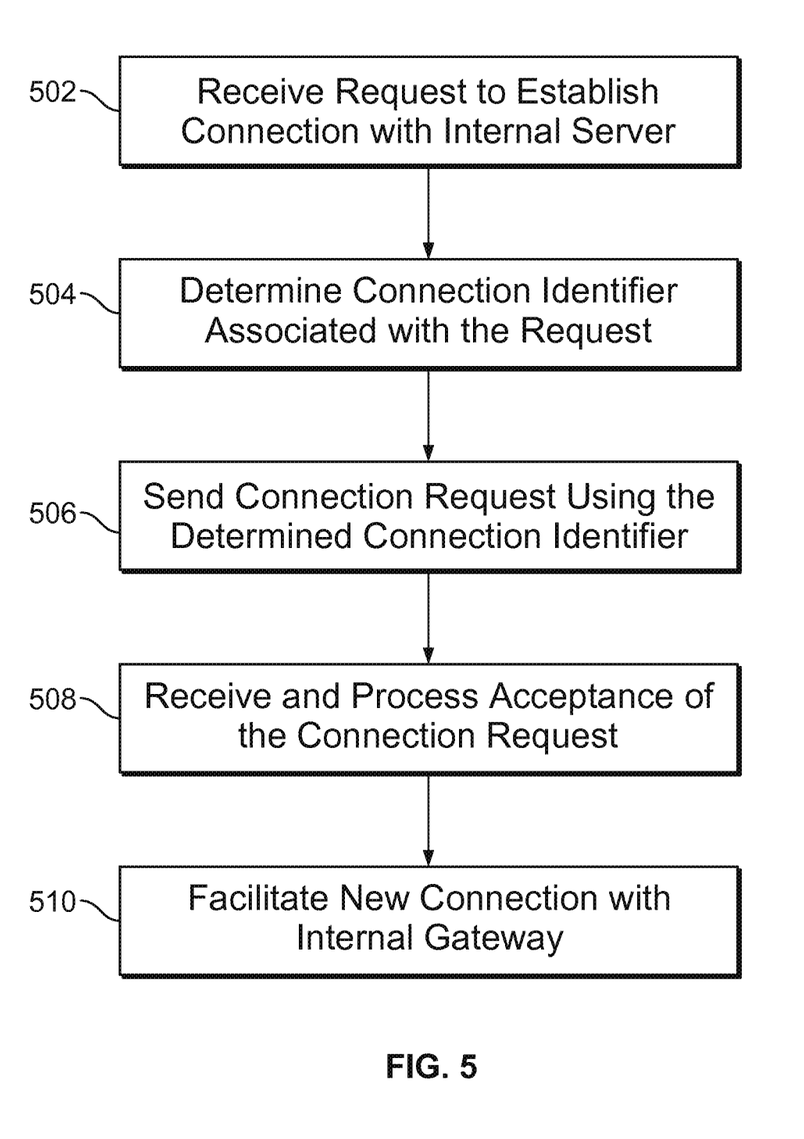
FIG. 5 is a flow chart illustrating an embodiment of a process for processing a connection request.

FIG. 5 is a flow chart illustrating an embodiment of a process for processing a connection request. The process of FIG. 5 may be implemented on perimeter gateway 112 of FIG. 1A and/or FIG. 1B. In some embodiments, the process of FIG. 5 is included in 406 of FIG. 4. At 502, a request to establish a connection with an internal server is received. In some embodiments, the received connection request is associated with the request received at 406 of FIG. 4. In some embodiments, the request is received from a requester such as requestor 102 and/or requestor 110 at perimeter gateway 112 to access internal server 118 of FIGS. 1A and/or 1B.

At 504, a connection identifier associated with the request is determined. In some embodiments, determining the connection identifier includes determining an appropriate connection identifier of a connection among a plurality of identifiers associated with one or more internal gateways. In some embodiments, the request includes an identifier of a desired data, service and/or system to be accessed, and this identifier is used to determine the connection identifier. In some embodiments, the connection identifier includes a connection identifier provided in 204 of FIG. 2. In some embodiments, the connection identifier may be preconfigured based on an identifier included in the request. In some embodiments, the connection identifier is dynamically determined, for example by using a table, a database, a service, a resource indicator and/or other dynamically changing/updated information. In some embodiments, if an appropriate connection identifier cannot be determined, the process ends and an error message is provided. In some embodiments, the connection identifier is associated with a logical connection of a multiplexed connection.

At 506, a connection request is sent using the determined connection identifier. In some embodiments, the connection request is sent via the received connection in 404 of FIG. 4. In some embodiments, the connection request is sent using a connection separate from the received connection in 404 of FIG. 4. For example, a separate control connection is established between the internal gateway and the perimeter gateway and the control connection is utilized to communicate information required to establish, manage, and/or disconnect one or more connections utilized to access an internal server. In some embodiments, the connection request sent in 506 is received at 206 of FIG. 2 and/or 302 of FIG. 3. In some embodiments, the connection request includes the determined connection identifier. In some embodiments, the connection request includes an identifier of a desired internal server and/or a desired data/service of an internal server.

At 508, an acceptance of the connection request is received and processed. In some embodiments, the received acceptance is the acceptance sent in 308 of FIG. 3. In some embodiments, once the connection request is accepted, a connection with the requestor of the request is bound to a reverse proxy connection with the appropriate internal gateway. In some embodiments, processing the acceptance includes associating together a connection with the requestor of the request with a connection to the appropriate internal gateway. In some embodiments, processing the acceptance includes associating together a connection of the requestor of the request with a logical connection of a multiplexed connection. In some embodiments, processing the connection request includes proxying communication between the connection with the requestor and the connection with the internal gateway. In some embodiments, processing the acceptance includes providing an acceptance notification to a requestor of the request that the request is successful and the desired data/service may be utilized. In some embodiments, in the event the connection request is not accepted, the connection request is reattempted after a predetermined amount of time (e.g., a back-off period). In some embodiments, in the event connection requests have not been accepted after a predetermined number of attempts, the process ends and an error message is provided.

At 510, a new connection with an internal gateway is facilitated. In some embodiments, facilitating the new connection includes receiving a connection provided in 310 of FIG. 3, and performing at least a portion of the process of FIG. 4. In some embodiments, the configuration information associated with the new connection may be preconfigured and/or received from an internal gateway. In some embodiments, at 510, a single new connection is facilitated after a previously received connection has been bound. In some embodiments, a plurality of new connections is facilitated at the same time. For example, an identifier associated with a number of pending connections to be bound is provided to an internal gateway to initiate a number of new connections based on the number of pending connections substantially at the same time. In some embodiments, facilitating the connection includes facilitating a new logical connection of a multiplexed connection between an internal gateway and a perimeter gateway.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for establishing a connection, comprising:
   a communication interface configured to:
   initiate a first communication link with a perimeter gateway located external to a private network firewall but behind a perimeter network firewall, wherein initiating the first communication link with the perimeter gateway includes providing to the perimeter gateway an internal gateway identifier of a service offered by an internal server, the internal gateway identifier includes a network location address of an internal gateway system location where the service offered by the internal server may be accessed, and the internal gateway identifier includes a protocol identifier of a protocol to be utilized between the perimeter gateway and the system;
   receive a request to allow the connection from a requestor that has requested the connection to the internal server via the perimeter gateway, wherein the requestor has requested the connection using a perimeter gateway identifier of the service offered by the internal server, the perimeter gateway identifier includes a network location address of the perimeter gateway where the service offered by the internal server may be accessed, and the perimeter gateway has determined that the perimeter gateway identifier of the service corresponds to the internal gateway identifier of the service and provided the request using the internal gateway identifier of the service; and initiate a second communication link with the internal server protected by the private network firewall, wherein initiating the second communication link includes determining that the internal gateway identifier of the service offered by the internal server corresponds to an internal server identifier of the service offered by the internal server; and a processor configured to:

allow the connection at least in part by binding the first communication link with the second communication link.

2. The system of claim 1, wherein the communication interface is further configured to initialize a new communication link with the perimeter gateway after the first communication link and the second communication link are associated together.

3. The system of claim 1, wherein the communication interface is further configured to receive an identifier associated with a number of pending connections to be bound.

4. The system of claim 3, wherein the communication interface is further configured to initialize together a plurality of new communication links associated with the received identifier.

5. The system of claim 1, wherein the requestor requested the connection via a public network external to perimeter network firewall.

6. The system of claim 1, wherein the first communication link and the second communication link are encrypted.

7. The system of claim 1, wherein the first communication link is associated with a reverse proxy.

8. The system of claim 1, wherein the first communication link is associated with a reverse SOCKS proxy.

9. The system of claim 1, wherein the first communication link is associated with a logical connection included in a plurality of logical connections multiplexed on a network connection.

10. The system of claim 1, wherein a communication protocol utilized on the first communication link is dynamically determined.

11. The system of claim 1, wherein initiating the first communication link includes mutually authenticating the perimeter gateway and the system.

12. The system of claim 1, wherein the request is received via the first communication link.

13. The system of claim 1, wherein the request is received via a third communication link.

14. The system of claim 1, wherein the internal server is not directly accessible by the requestor.

15. The system of claim 1, wherein the first communication link with the second communication link are utilized to proxy communications between the perimeter gateway and the internal server.

16. A system for establishing a connection, comprising:

a communication interface configured to:

receive a communication link from an internal gateway located behind a private network firewall, wherein receiving the communication link includes receiving from the internal gateway an internal gateway identifier of a service offered by an internal server, the internal gateway identifier includes a network location address of the internal gateway where the service offered by the internal server may be accessed, and the internal gateway identifier includes a protocol identifier of a protocol to be utilized between the system and the internal gateway;

establish a reverse proxy connection with the internal gateway using the communication link; and receive a request to establish the connection with the internal server protected by the private network firewall, wherein the request includes a perimeter gateway identifier of the service offered by the internal server and the perimeter gateway identifier includes a network location address of a perimeter gateway system location where the service offered by the internal server may be accessed; and a processor configured to:

determine that the request is associated with the reverse proxy connection; and establish the connection using the reverse proxy connection, wherein the connection is bound to the reverse proxy connection, wherein establishing the connection includes determining that the perimeter gateway identifier of the service corresponds to the internal gateway identifier of the service and utilizing the internal gateway identifier of the service;

wherein the internal gateway determines that the internal gateway identifier of the service offered by the internal server corresponds to an internal server identifier of the service offered by the internal server.

17. A method for establishing a connection, comprising:

initiating a first communication link with a perimeter gateway located external to a private network firewall but behind a perimeter network firewall, wherein initiating the first communication link with the perimeter gateway includes providing to the perimeter gateway an internal gateway identifier of a service offered by an internal server, the internal gateway identifier includes a network location address of an internal gateway where the service offered by the internal server may be accessed, and the internal gateway identifier includes a protocol identifier of a protocol to be utilized between the perimeter gateway and the internal gateway;

receiving a request to allow the connection from a requestor that has requested the connection to the internal server via the perimeter gateway, wherein the requestor has requested the connection using a perimeter gateway identifier of the service offered by the internal server, the perimeter gateway identifier includes a network location address of the perimeter gateway where the service offered by the internal server may be accessed, and the perimeter gateway has determined that the perimeter gateway identifier of the service corresponds to the internal gateway identifier of the service and provided the request using the internal gateway identifier of the service;

initiating a second communication link with the internal server protected by the private network firewall, wherein initiating the second communication link includes determining that the internal gateway identifier of the service offered by the internal server corresponds to an internal server identifier of the service offered by the internal server; and using a processor to allow the connection at least in part by binding the first communication link with the second communication link.

18. A method for establishing a connection, comprising:

receiving a communication link from an internal gateway located behind a private network firewall, wherein receiving the communication link includes receiving from the internal gateway an internal gateway identifier of a service offered by an internal server, the internal gateway identifier includes a network location address of the internal gateway where the service offered by the internal server may be accessed, and the internal gateway identifier includes a protocol identifier of a protocol to be utilized between a perimeter gateway and the internal gateway;

establishing a reverse proxy connection with the internal gateway using the communication link;

receiving a request to establish the connection with the internal server protected by the private network firewall, wherein the request includes a perimeter gateway identifier of the service offered by the internal server and the perimeter gateway identifier includes a network location address of the perimeter gateway where the service offered by the internal server may be accessed;

determining that the request is associated with the reverse proxy connection; and establishing the connection using the reverse proxy connection, wherein the connection is bound to the reverse proxy connection, wherein establishing the connection includes determining that the perimeter gateway identifier of the service corresponds to the internal gateway identifier of the service and utilizing the internal gateway identifier of the service;

wherein the internal gateway determines that the internal gateway identifier of the service offered by the internal server corresponds to an internal server identifier of the service offered by the internal server.

* * * * *